United States Patent [19]

Sueda

[11] Patent Number: 4,875,892
[45] Date of Patent: Oct. 24, 1989

[54] STEPLESSLY VARIABLE TRANSMISSION CONTROL FOR AUTOMOTIVE VEHICLE

[75] Inventor: Yutaka Sueda, Hiroshima, Japan

[73] Assignee: Mazda Motor Corporation, Hiroshima, Japan

[21] Appl. No.: 298,971

[22] Filed: Jan. 19, 1989

[30] Foreign Application Priority Data

Jan. 19, 1988 [JP] Japan .................................. 63-10433

[51] Int. Cl.$^4$ ............................................. F16H 11/04
[52] U.S. Cl. ........................................ 474/17; 74/865; 474/18
[58] Field of Search .................... 474/8, 11, 12, 17, 18, 474/28, 69, 70; 74/865–869

[56] References Cited

U.S. PATENT DOCUMENTS

| 4,704,683 | 11/1987 | Osanai | 74/865 X |
| 4,718,308 | 1/1988 | Haley | 474/28 X |
| 4,752,277 | 6/1988 | Morimoto | 474/18 |

FOREIGN PATENT DOCUMENTS 62-52176  11/1987  Japan .

Primary Examiner—Thuy M. Bui
Attorney, Agent, or Firm—Fleit, Jacobson, Cohn, Price, Holman & Stern

[57] ABSTRACT

An apparatus for controlling the speed ratio of a steplessly variable transmission of an automotive vehicle comprises a belt-pulley type of steplessly variable transmission mechanism, a speed ratio control device for steplessly varying the speed ratio of the belt-pulley transmission mechanism according to speed ratio change schedules of a target engine speed relative to a vehicle speed depending upon engine load conditions, and a drive mode change device for changing the steplessly variable transmission in operation between a power drive priority mode and a fuel economy drive priority mode and changing the speed ratio change schedules to two different patterns, one suitable for the power drive priority mode and the other suitable for the economy drive mode according to the change of drive mode.

The speed ratio change schedules are previously established to be identical at a maximum and a minimum engine load between the two drive modes, but, between the maximum and the minimum engine load, to have a high rate of change of the target engine speed relative to change of engine load within a range of low engine loads for the power drive mode and within a range of high engine loads for the economy drive mode or a low ratio of change of the target engine speed relative to change of engine load within a range of high engine loads for the power drive mode and within a range of low engine loads for the economy drive mode.

13 Claims, 7 Drawing Sheets

STEPLESSLY VARIABLE TRANSMISSION CONTROL FOR AUTOMOTIVE VEHICLE

BACKGROUND OF THE INVENTION

The present invention relates to a steplessly variable transmission for automotive vehicles, and more particularly to a speed ratio control of an automotive vehicle transmission having a belt-pully type, steplessly variable transmission mechanism.

One known type of steplessly variable transmission has belt-pulley transmission mechanism which includes a pair of, or primary and secondary, pulleys variable in pitch or effective diameter and an endless belt rotationally coupling the pair of pulleys together. The primary pulley is connected to an engine output and the secondary pulley to a drive line. Either one or both of the primary and secondary pulleys are changeable in effective diameter to steplessly vary the speed ratio of the belt-pulley transmission mechanism. Such a steplessly variable transmission is disclosed in, for example, Japanese Patent Publication No. 62-52,176 entitled "Speed Ratio Control For A Steplessly Variable Vehicle Transmission", published Nov. 4, 1987. In the steplessly variable transmission disclosed by the above noted Japanese Patent Publication, the speed ratio of the belt-pulley transmission mechanism is controlled in such a way as to change the speed ratio of the belt-pulley transmission mechanism so as to vary an engine speed of the vehicle engine following predetermined or preselected speed ratio change schedules of a target engine speed relative to a vehicle speed at various throttle openings of an engine throttle between full throttle and idle throttle.

Steplessly variable transmissions are often equipped with a drive mode change feature allowing the drive mode to be changeable in operation between an economy drive mode, in which the vehicle acceleration is relatively moderate for fuel economy, and a power drive mode, in which the vehicle is provided with power and is accelerated. In a steplessly variable transmission of this type, maps of speed ratio change schedules, one of which is provided for each of various engine loads or throttle openings, have different patterns in the economy and power drive modes. For example, the above noted Jananese Patent Publication discloses the maps of speed ratio change schedules as having different patterns in the power and economy drive modes. The speed ratio change schedules are different at an upper engine load limit, namely at full throttle, but are identical at a lower engine load limit or an idle throttle. In more detail, the speed ratios at various throttle openings, including a full throttle opening, are generally established so that they are higher over the whole range of vehicle speeds for the power drive mode than they are for the economy drive mode. According to this prior steplessly variable transmission, the vehicle engine fuel consumption is improved, since an increase in engine speed is suppressed in the economy drive mode. On the other hand, engine output power is also improved, since engine speed can be increased higher in the power drive mode.

The biggest drawback to the use of such maps of speed ratio change schedules is that, because the speed of a vehicle engine is suppressed so as to be relatively low at a full throttle in the economy drive mode, it is hard to accelerate the vehicle sufficiently at a full throttle. This leads to a lack of engine output over a range of relatively large throttle openings. Also, because the speed of the vehicle engine can still become higher, the fuel performance takes a turn for the worse if a high engine output is not necessary.

OBJECT OF THE INVENTION

It is, therefore, an object of the present invention to provide a steplessly variable transmission which can meet somewhat conflicting requirements that govern engine output and fuel performance as well as to provide an vehicle engine which demonstrates its unique ability in the power drive and economy drive modes.

SUMMARY OF THE INVENTION

The present invention relates to an apparatus for steplessly controlling the speed ratio of a steplessly variable transmission of an automotive vehicle. The steplessly variable transmission control apparatus of the present invention comprises belt-pulley transmission means having a pair of pulleys, primary and secondary, which are variable in effective diameter and coupled to each other by means of an endless belt between a vehicle engine and a drive line, speed ratio control means for varying the speed ratio of the belt-pulley transmission means according to speed ratio change schedules of a target engine speed relative to a vehicle speed depending upon load conditions of the vehicle engine, and drive mode changing means for changing the steplessly variable transmission, in operation, between a power drive mode suitable for powerful driving and an economy drive mode suitable for fuel economy driving, and changing the speed ratio change schedules between two different patterns, namely a pattern suitable for the power drive mode and a pattern suitable for the economy drive mode, according to the change of drive mode.

The speed ratio change schedules are previously established to be identical at upper and lower extreme engine loads, or a maximum and a minimum engine load, between the power drive and economy drive modes. However, between the maximum and the minimum engine load, the speed ratio change schedules provide a relatively high ratio of change of the target engine speed relative to change of engine load within a range of relatively low engine loads for the power drive mode and within a range of relatively high engine loads for the economy drive mode, or a relatively low ratio of change of the target engine speed relative to change of engine load within a range of relatively high engine loads for the power drive mode and within a range of relatively low engine loads for the economy drive mode.

An important advantage of the present invention resides in that, in the economy drive mode, although the engine is generally operated at a low speed of rotation so as to provide good fuel consumption over the whole range of engine speed, it can provide a sufficient engine output at the maximum engine load. Also, in the power drive mode, the engine is generally operated at a high speed of rotation for powerful driving, and can be operated at a low speed within a range of low engine loads to provide a good fuel consumption.

BRIEF DESCRIPTION OF THE DRAWINGS

The above, and other objects, features and advantages of the present invention will become apparent to those skilled in the art from the following detailed description of the preferred embodiments, considered together with the accompanying drawings, in which.

DETAILED DESCRIPTION OF THE INVENTION

Parts which do not form part of, or cooperate directly with, the invention and parts which are purely of conventional construction will not be described in detail. It is to be understood that parts not specifically shown or described can take various forms well known to those skilled in the automotive vehicle transmission art.

Figure 1:
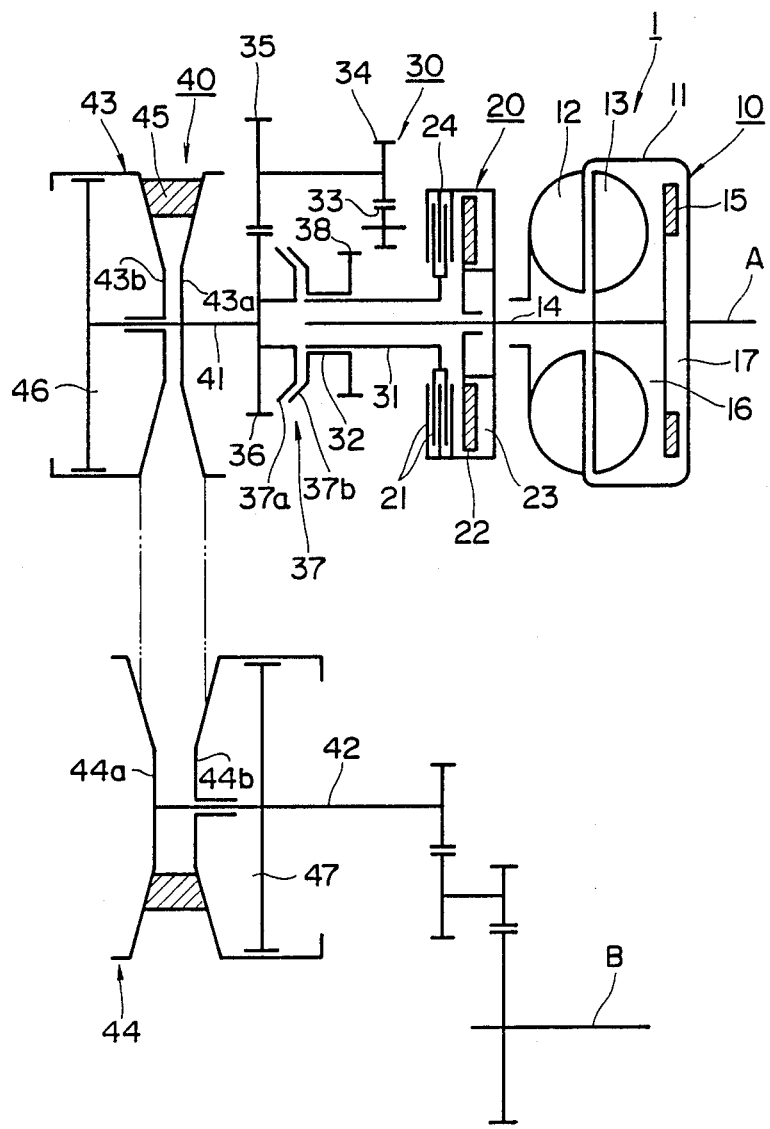
FIG. 1 is a schematic diagrammatical illustration, partly in section, of a steplessly variable transmission in accordance with the present invention.

Referring now to FIG. 1, a setup of the steplessly variable transmission 1 according to a preferred embodiment of the present invention is shown as including a fluid coupling, in particular a torque converter 10 connected to a transmission input shaft or engine output shaft A, such as an engine crank shaft, a multiple disc clutch or drive clutch 20 connected to an output to the fluid coupling 10, a forward/reverse shift unit 30 and a belt-pulley transmission unit 40 connecting and transmitting power from the fluid coupling 10 to a transmission output shaft B.

Torque converter 10, which can multiply engine torque, comprises a pair of torus members, a driving torus or pump 12 and a driven torus or turbine 13, placed face to face with a slight clearance therebetween. The two tori are fastened to shafts, the pump 12 to the engine output shaft A and the turbine 13 to an output shaft 14. A thin housing 11 surrounds the turbine 13 and extends and holds the pump 12. As is well known, the housing 11 is filled with a special lightweight oil to transmit engine power from the pump 12 to the turbine 13. The torque converter 10 is further equipped with a lockup clutch 15 having a clutch piston to either mechanically lock together or free the pump 12 and turbine 13, thereby either preventing or allowing some slipping action of the torque converter. When transmission fluid flows into a space 17, hereinafter referred to as a release chamber, there is no contact between the housing 11 and friction surface of the clutch piston of the lockup clutch 15. The pump 12 and turbine 13 are accordingly mechanically free of each other and drive is provided through the fluid. When lockup conditions are present, transmission fluid will flow into a space 16, hereinafter referred to as a lockup chamber, between the turbine 13 and lockup clutch 15. The clutch will move, engaging the friction surface of the clutch piston of the lockup clutch 15 with the housing 11 to lock the pump and turbine 12 and 13 together.

Drive clutch 20, which takes the form of a known multiple disc clutch, is connected between the ouput shaft 14 of the torque converter 10 and an input shaft 31 of the forward/reverse shift unit 30. Drive clutch 30 has a stack of clutch plates or discs 21 comprises a plurality of (for example five in this embodiment, but the number varies) driving and driven discs or plates arranged in alternate fashion. As is well known in the art, the driving discs are splined to a clutch hub splined to the input shaft 31; the driven discs are splined to the clutch drum 34. A clutch piston 22 in the clutch drum 24 squeezes the clutch discs 21 together when transmission fluid will flow into a fluid chamber 23 and oil pressure is applied to the clutch piston 22, so as to mechanically couple the output shaft 14 of the torque converter 10 and the input shaft 31 of the forward/reverse shift unit 30 together.

Forward/reverse shift unit 30 has a clutch 37 comprising a clutch disk 37b and a flywheel 37a. The clutch disc 37b is fastened to a shift sleeve 32, integrally formed with or securely attached with a clutch gear 38, slidably splined on the input shaft 31 of the forward/reverse shift unit 30; the flywheel 37a is fastened to one of four gears, namely first to fourth gears 33–36 in mesh with one another of a gear train. The fourth gear 36 of the gear train is fastened to an input shaft of the belt-pulley transmission unit 40. At a position of the shift sleeve 32 shown in FIG. 1, the clutch 37 mechanically directly couples together the input shaft 31 and the fourth gear 36 of the gear train, directly connecting the transmission of output torque of the torque converter 10 to the belt-pulley transmission unit 40. When the shift sleeve 32 is slid to left as viewed in FIG. 1, the clutch 37 is released to disconnect the direct transmission of torque and brings the shift clutch gear 38 into mesh with the first gear 33 of the gear train, building up a reverse gear train between the shift clutch gear 38 and the fourth gear 36. The reverse gear train transmits reversed rotation, with multiplying torque, to the fourth gear from the input shaft 31 of the forward/reverse shift unit 30.

Belt-pulley transmission unit 40 has an input shaft 41 and an output shaft 42 laterally spaced from and located in parallel with the input shaft 41. Associated with the input and output shafts 41 and 42, respectively, are driving or primary and driven or secondary pulley assemblies 43 and 44 rotationally connected with an endless V-belt 45. The primary pulley assembly 43 comprises a stationary pulley flange or disc 43a and a movable pulley disc 43b having a generally frustoconical configuration. Discs 43a and 43b are arranged coaxially in face-to-face fashion. The stationary pulley flange 43a is fastened to the input shaft 41; the movable pulley disc 43b is slidably mounted on the input shaft 41 to move axially close to or away from the stationary pulley disc 43a so as thereby to decreasingly or increasingly vary the distance between the stationary and movable pulley discs 43a and 43b. With this variation of distance, the primary pulley assembly 43 changes in effective diameter.

Secondary pulley assembly 44 is substantially identical in structure and operation with the primary pulley assembly 43 and comprises a stationary pulley disc 44a fastened to the output shaft 42 and a movable pulley disc 44b slidably mounted on the output shaft 42 to move axially close to or away from the stationary pulley disc 44a so as thereby to decreasingly or increasingly vary the distance between the stationary and movable pulley discs 43a and 43b, and therefore an effective diameter of the secondary pulley assembly 44. For causing axial movement of each movable pulley disc 43b, 44b, there are provided fluid operated primary and secondary cylinders 46 and 47 cooperating with the movable pulley discs 43b and 44b, respectively. The primary and secondary cylinders 46 and 47 are operationally corelated and actuated simultaneously in such a way as to move the movable pulley discs 43b and 44b so as to inversely vary the effective diameter of the primary and secondary pulley assemblies 43 and 44. In more detail, if the primary cylinder 46 is filled with fluid and thereby actuated to displace the movable pulley disc 43b axially toward the stationary pulley disc 43a, the effective diameter of the primary pulley assembly 43 is increased. Upon this actuation of the cylinder 46, fluid is discharged from the secondary cylinder 47 so that the second cylinder is actuated to displace the movable pulley disc 44b axially relative to the stationary pulley disc 44a, complementarily decreasing the effective diameter of the secondary pulley assembly 44. In such a way, the belt-pulley transmission unit 40 increasingly or decreasingly changes the transmission ratio. It is noted that the fluid supplied to secondary cylinder 47 is applied with a certain pressure sufficient for tightening the V-belt 45 with appropriate tension.

Figure 2:
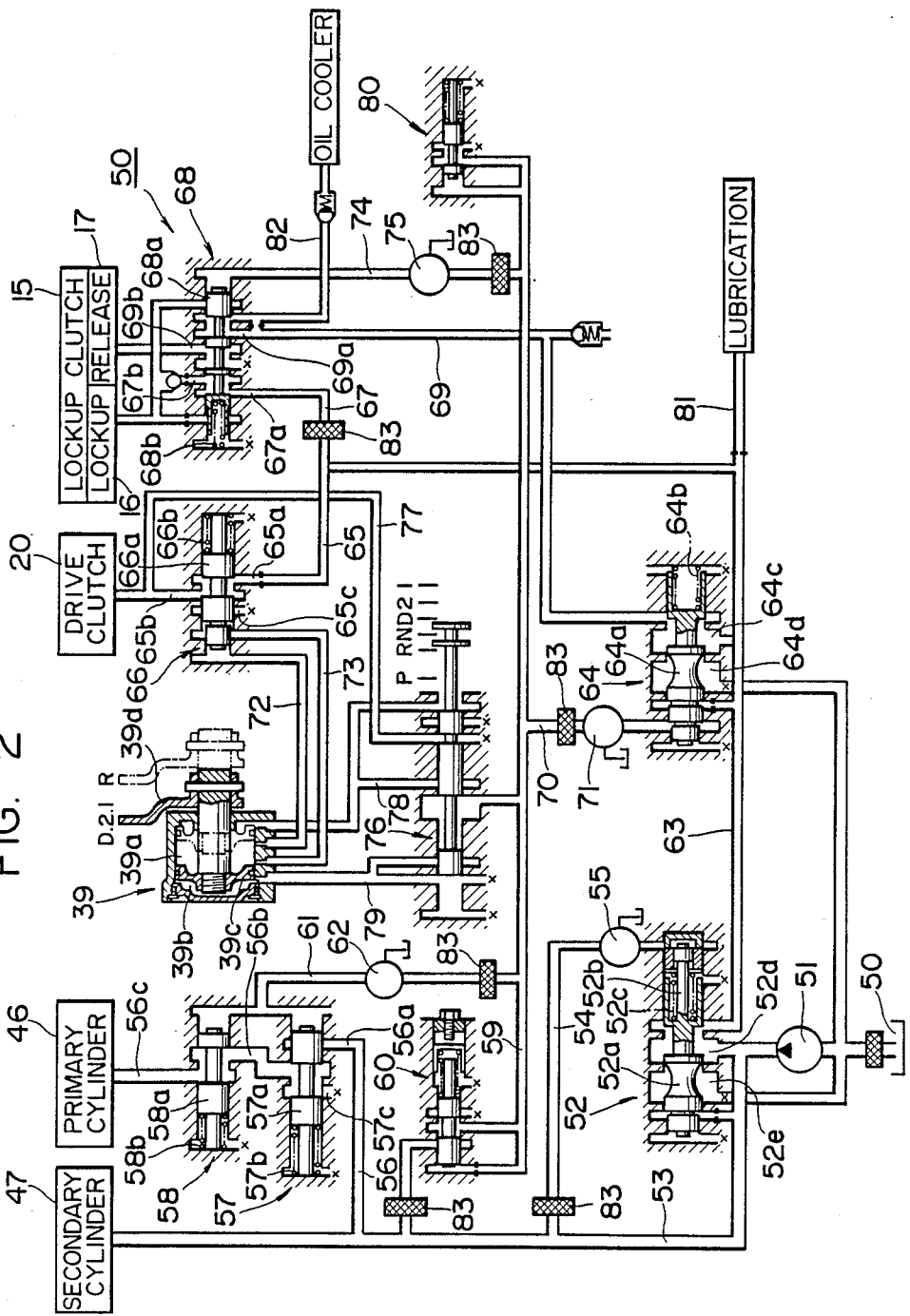
FIG. 2 is a diagrammatic illustration of a hydraulic control circuit to control the steplessly variable transmission shown in FIG. 1.

Lockup clutch 15, drive clutch 20, forward/reverse shift unit 30 and belt-pulley transmission unit 40 are all actuated by means of respectively associated actuators whose operations are controlled by a control system consisting of a hydraulic circuit 50 shown in detail in FIG. 2. As shown, the hydraulic control circuit 50 includes a hydraulic pump 51 operated by an engine of the automobile vehicle. The pump 51 pumps fluid or oil and forces it into a secondary pressure regulator valve 52 for producing a regulated hydraulic pressure which is referred to as a secondary pressure. The secondary pressure adjusted to a predetermined pressure flows into the secondary cylinder 47 of the secondary pulley assembly 44 through a pressure line 53.

Regulator valve 52 has principal and complementary spools 52a and 52b slidably disposed in the axial direction in the valve body. Between the principal and complementary spools 52a and 52b, a return spring 52c is provided to urge or bias the principal spool 52a so as to displace it towards the left as viewed in FIG. 2. The valve body has an inlet or regulating port 52d formed at the middle and a drain port 52e axially adjacent to the inlet port 52d. Through the inlet port 52d the regulated pressure is applied to the principal spool 52a to displace it toward the right as viewed in FIG. 2. At one end, the regulator valve 52 is communicated with the pressure line 53 by means of a branched pressure line 54 including a first duty solenoid valve 55 which is well known per se in the art. The first duty solenoid valve 55 regulates hydraulic pressure and applies it as pilot pressure into the regulator valve 52 at the end of the complementary spool 52b. The principal spool 52a is displaced towards the left with the pilot pressure as well as with the return spring 52c. The principal spool 52a is accordingly axially displaced towards the left or right according to the difference between the pressures exerted on both sides thereof, connecting or disconnecting the transmission of hydraulic pressure between the inlet port 52d and drain port 52e. As a result, the secondary pressure in the pressure line 53 is controlled to become equal to the pilot pressure.

Pressure line 53 also branches off into a pressure line 56 to connect the secondary pressure to a transmission speed ratio control actuator comprising first and second control valves 57 and 58 whose outlet and inlet ports are in communication with each other through a connecting pressure line 56b. The second control valve 58 is connected to the primary cylinder 46 in association with the primary pulley assembly 43. The first and second control valve 57 and 58 are identical in structure and have spools 57a and 58a urged or biased by means of return springs 57b and 58b, respectively. A second duty solenoid valve 62 is connected to the first and second control valves 57 and 58 at one end of both of the control valves through a pressure line 61 and also to the pressure line 53 through a reducing valve 60. The hydraulic pressure from the pressure line 53, after being reduced and regulated through the reducing valve 60 and the second duty solenoid valve 62, is applied as pilot pressure to the spools 57a and 58a to move them against the associated springs 57b and 58b. It is noted here that the spring 57b of the first control valve 57 has a spring constant larger than that the spring 58b of the second control valve 58 has. It is also noted that the spools 57a and 58a are displaced to one extreme position shown in FIG. 2 against the biasing springs 57b and 58b when they receive a pilot pressure larger than a predetermined pressure at their end, so that the spool 57a closes the pressure line 56a as its inlet pressure line and connects the drain line 57c with the connecting pressure line 56b as its outlet pressure line and the spool 58a connects the connecting pressure line 56b as its inlet pressure line with its outlet pressure line 56c. Otherwise, when the pilot pressure received by the spools 57a and 58a becomes slightly lower than the predetermined pressure, only the spool 57a of the first control valve 57 is displaced by the associated biasing spring 57b to return to its other extreme position opposite to the one extreme position shown in FIG. 2 while the spool 58b is maintained as it is, so as to connect the inlet and outlet pressure lines 56a and 56b of the first control valve 57. Therefore, when a pilot pressure slightly lower than the predetermined pressure is applied to the spools 57a and 58a, the hydraulic pressure in the pressure line 53 is introduced into the primary cylinder 47 of the primary pulley assembly 43. If the pilot pressure becomes sufficiently lower than the predetermined pressure, the spool 58a of the second control valve 58 is then displaced by the associated biasing spring 58b to return to the opposite extreme position, so as to shut off the inlet and outlet pressure lines 56b and 56c of the second control valve 58. As a result, hydraulic pressure is trapped in the primary cylinder 47 of the primary pulley assembly 43. In such a way as described above, the first and second control valves 57 and 58 controls the hydraulic pressure applied to the primary cylinder 47 and connects or disconnects the supply of hydraulic pressure to the primary cylinder 47 to thereby vary the transmission ratio of the belt-pulley transmission unit 40.

Regulator valve 52 is connected to a clutch operating pressure regulator valve 64 through a pressure line 63. The regulator valve 64 regulates hydraulic pressure to a predetermined pressure and applies it to a control valve 66 working as an actuator for the drive clutch 20. The drive clutch control valve 66 acts to connect or disconnect the supply of regulated hydraulic pressure to the fluid chamber 23 of the drive clutch 20 through an outlet pressure line 65b. The regulator valve 64 is connected also to a lockup clutch control valve 68 working as an actuator for the lockup clutch 15 through a pressure line 67 and a pressure line 69 separately provided. The lockup clutch control valve 68 acts to connect or disconnect the supply of regulated hydraulic pressure alternately to the lockup chamber 16 and release chamber 17.

Regulator valve 64 has a slidable spool 64a and a biasing spring 64b axially biasing the spool 64a in one direction and is formed with an inlet port 64c connected to the pressure line 63 and a drain port 64d adjacent to the inlet port 64 connected to the fluid tank 50. The spool 64a receives the regulated hydraulic pressure in the pressure line 63 and a pilot pressure regulated by means of a third duty solenoid valve 71 disposed in a pressure line 70 diverging from the pressure line 59, both acting on the spool 64a against the biasing spool 64a. According to differences between the pressures, the spool 64a slides to variably connect or disconnect the communication of hydraulic pressure between the inlet port 64 and the drain port 64d, adjusting the hydraulic pressure applied to the drive clutch 20 through the pressure line 65 to the pilot pressure regulated by the third duty solenoid valve 71.

Drive clutch control valve 66 connected between the regulator valve 64 and the drive clutch 20, in particular to the fluid chamber 23 thereof, has a slidable spool 66a and a biasing spring 66b axially biasing the spool 66a in one direction and is formed with an inlet port 64c connected to the pressure line 63. The spool 66a slides to an actuating position opposite to a position shown in FIG. 2 and connects the communication of hydraulic pressure between an inlet pressure line 65a connected to the pressure line 65 and an outlet pressure line 65b to apply the hydraulic pressure in the pressure line 65 into the fluid chamber 23 of the drive clutch 20 when it receives a hydraulic pressure from a control actuator 39 for the forward/reverse shift unit 30 through pressure lines 72 and 73, actuating the drive clutch 20. Otherwise, when the spool 66a receives no pressure from the control actuator 39, it returns to a releasing position which is opposite to the position shown in FIG. 2 to connect the inlet pressure line 65b to a drain port 65c and remove or drain the hydraulic pressure from the fluid chamber 23 of the drive clutch 20, releasing the drive clutch 20.

Lockup clutch control valve 68 has a slidable spool 68a and a biasing spring 68b biasing the spool 68 in one direction and is connected with a pressure line 74 having a fourth duty solenoid valve 75. The spool 68a receives at its end a pilot hydraulic pressure regulated by means of the fourth duty solenoid valve 75 against the biasing spring 68b. The spool 68a slides to a lockup position shown by a solid line in FIG. 2 against the biasing spring 68b to connect the communication of hydraulic pressure between its lockup inlet and outlet pressure lines 67a and 67b when it receives a pilot hydraulic pressure larger than the biasing force of the biasing spring 68b. Otherwise, when the pilot hydraulic pressure is lowered, the spool 68 is slid and returns to an unlocked position shown by a phantom line in FIG. 2 to connect the communication of hydraulic pressure between its unlock inlet and outlet pressure lines 69a and 69b. The lockup clutch control valve 68 thus operating can apply hydraulic pressure alternately into the lockup and release chambers 16 and 17 of the lockup clutch 15, actuating or deactuating the lockup clutch 15. It is noted that the fourth duty solenoid valve 75 can finely adjust the pilot hydraulic pressure to a pressure in harmony with the biasing spring 68b. Therefore, when the pilot pressure is in harmony with the biasing spring 68b, the hydraulic pressures in the lockup and release chambers 16 and 17 are balanced, enabling the lockup clutch 15 to allow the torque converter 10 to cause slipping action.

Hydraulic control circuit 50 further has a select valve 76 in cooperation with a shift lever (not shown) operated to shift a transmission into desired ranges. When the select valve 76 is shifted to a park range (P) selecting position or a neutral or idle range (N) selecting position, it connects a pressure line 77 in communication with the outlet pressure line 65a of the clutch valve control valve 66 to one of the drain ports (x) to release the drive clutch 20. On the other hand, when the select valve 76 is shifted to one of the forward drive ranges (D, 2 and 1), it shuts off the pressure line 77 to lock up the drive clutch 20 and connects the pressure line 59 from the reducing valve 60 to the forward pressure chamber 39a of the control actuator 39 of the forward/reverse shift unit 30. It is noted that the select valve 76 connects the pressure line 59 to the reverse pressure chamber 39b of the control actuator 39 at a reverse range (R) selecting position.

Control actuator 39 is controlled so that its piston 39c protrudes to a forward position shown by a solid line in FIG. 2 when a hydraulic pressure is built up in the forward pressure chamber 39c, shifting the shift sleeve 32 of the forward/reverse shift unit 30 through a shift fork 39d to directly connect the input shaft 31 of the forward/reverse shift unit 30 and the input shaft 41 of the belt-pulley transmission unit 40 or so that the piston 39c protrudes to a reverse position which is opposite to the position shown in FIG. 2 when a hydraulic pressure is built up in the reverse pressure chamber 39b, shifting the shift sleeve 32 of the forward/reverse shift unit 30 to connect the input shafts 31 and 41 of the forward-/reverse shift unit 30 and the belt-pulley transmission unit 40 through the gears 33–36 and 38. The control actuator 39 connects one of the forward and reverse pressure chambers 39a and 39b in which a hydraulic pressure is built up to pressure lines 72 and 73 so as to apply a hydraulic pressure to the drive clutch control valve 66. While the piston 39c is between the two positions, forward and reverse, it temporarily shuts off the application of hydraulic pressure to the drive clutch control valve 66. In such a way, according to the action of the control actuator 39, the drive clutch control valve 66 actuates its spool 66a to connect or disconnect the application of hydraulic pressure to the drive clutch 20, locking the drive clutch 20 upon forward or reverse driving or releasing the drive clutch 20 during the change between forward and reverse driving. In the hydraulic control circuit 50, further provided are a relief valve 80 at the end of the pressure line 59, an extension pressure line 81 branching off toward various operational elements for lubrication, an oil cooler connected to the lockup clutch control valve 68 through a drain line 82, and oil filters 83 appropriately located in the oil lines.

Figure 3:
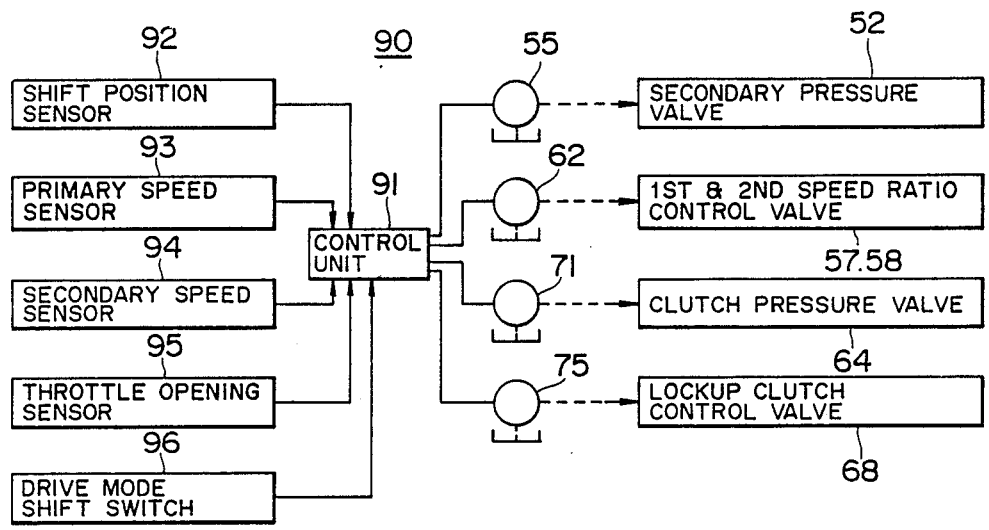
FIG. 3 is a block diagram showing an electric circuit to control the steplessly variable transmission shown in FIG. 1.

Referring now to FIG. 3, an electric control circuit 90 is shown in block diagram including a duty control unit 91 mainly comprising a microcomputer for the first to the fourth duty solenoids 55, 62, 71 and 75. The control unit 91 is connected with outputs of various sensors, such as a selected drive range sensor 92 for detecting the operated position of the shift lever, a first speed sensor 93 for detecting the speed of rotation of the primary pulley assembly 43 which is referred to as the speed of engine, a second speed sensor 94 for detecting the speed of rotation of the secondary pulley assembly 44 which is referred to as the speed of vehicle, a throttle opening sensor 95 for detecting the opening of an engine throttle, and a drive mode shift switch 96 for shifting the vehicle engine and the steplessly variable transmission between different drive modes, namely a power drive mode (P) or an economy drive mode (E) which will be described later.

The control unit 91 controls the first to fourth duty solenoids valves 55, 62, 71 and 75 according to the outputs from the sensors and switch 92 to 96 to perform the adjustment of pilot pressure for the secondary pressure regulator valve 52, the first and second speed ratio control valves 57 and 58, the clutch operating pressure regulator valve 64 and the lockup clutch control valve 68, respectively, so as to control the line pressure to the secondary pulley assembly 44 to adjust the tension of the V-belt 45 or to the drive clutch 20, the application of pressure to the primary pulley assembly 43 to control the speed ratio of the belt-pulley transmission unit 40, and the operation of the lockup clutch 15.

Figure 4:
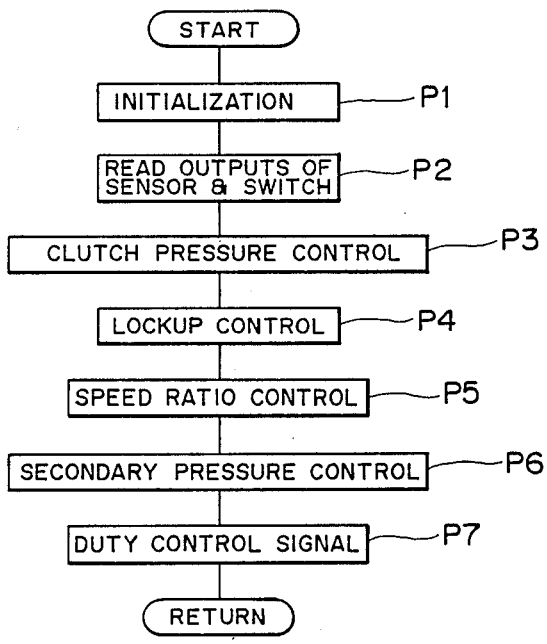
FIG. 4 is a flow chart illustrating a general sequence or main routine for a controller which controls operation of the steplessly variable transmission shown in FIG. 1.
Figure 5:
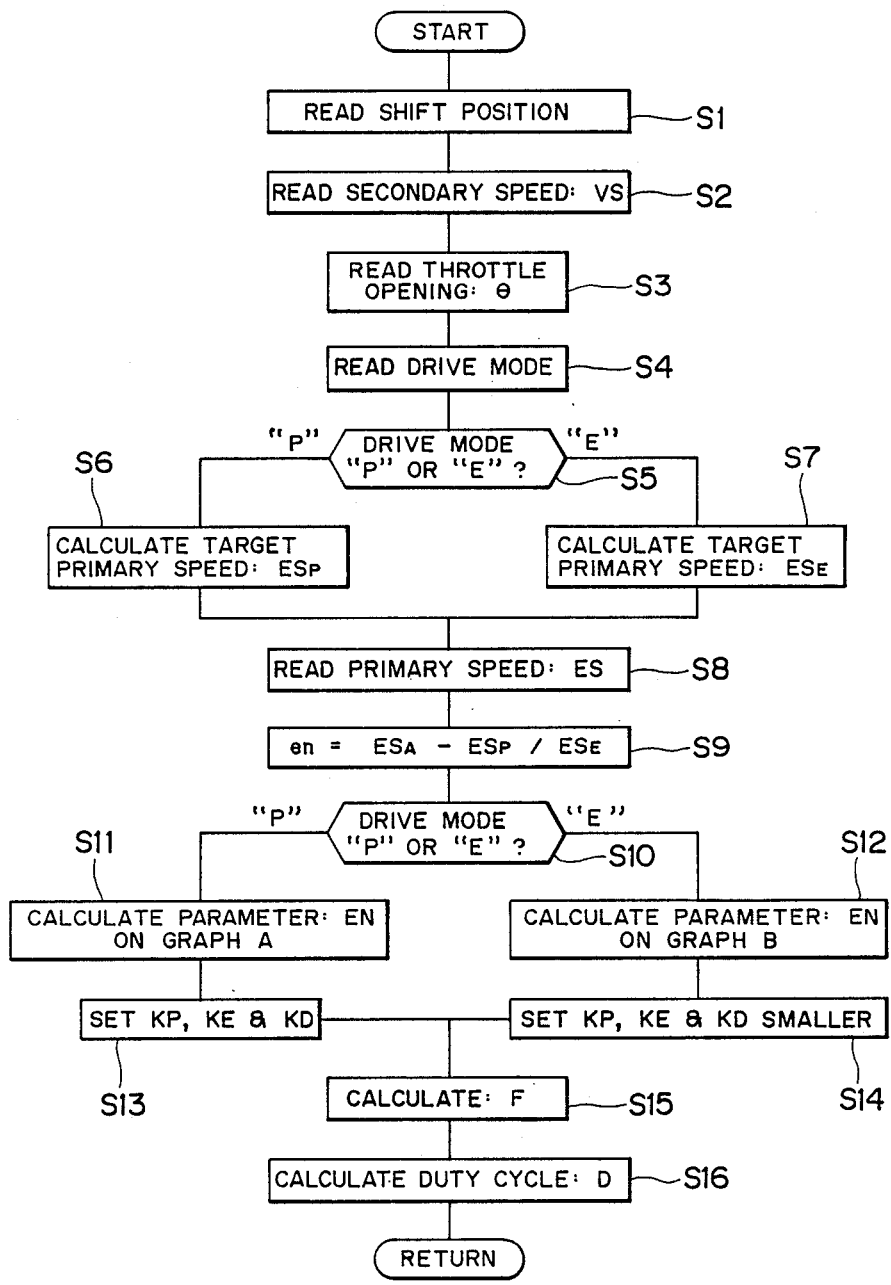
FIG. 5 is a flow chart illustrating a speed ratio control subroutine for the controller.

The operation of the steplessly variable transmission shown in FIGS. 1 to 3 is best understood by reviewing FIGS. 4 and 5, which are flow charts illustrating a general routine and a speed ratio control subroutine for the microcomputer of the duty control unit 91. Programming a microcomputer is a skill well understood in the art. The following description is written to enable a programmer having ordinary skill in the art to prepare an appropriate program for the microcomputer of the duty control unit 91.

Referring to FIG. 4 which shows the general routine, the system is at first initialized at step P1 and the control unit 91 reads the conditions or outputs of the sensors 92 to 96 at step P2. Thereafter, the control unit 91 establishes an appropriate duty rate or cycle (the ratio of operative time of the solenoid relative to inoperative time) of each duty solenoid valve 55, 62, 71, 75 to perform the control of pilot pressure in order to effect the clutch operating pressure control, the lockup control, the speed ratio control, and the secondary pressure control, in order, at steps P3 through P6, respectively. At step P7, the control unit 91 provides a duty signal to each duty solenoid valve 55, 62, 71, 75 to operate it at the established duty cycle.

FIG. 5 shows the speed ratio control subroutine. The first four steps S1-S4 in FIG. 5 are to read the condition of the sensors and switch, the selected drive range sensor 92, secondary speed or vehicle speed sensor 94, throttle opening sensor 95 and the drive mode shift switch 96 to determine the condition of driving. Then, a determination is made at step S5 as to the shifted drive mode, i.e. whether the device is in the power drive mode (P) or the economy drive mode (E). According to the answer to the decision, the control unit 91 determines a target primary speed of rotation with reference to an appropriate power drive speed ratio control map at step S6 if the power drive mode (P) has been selected or with reference to an appropriate fuel economy drive speed ratio change control map at step S7 if the economy drive mode (E) has been selected, respectively. It should be noted here that the target primary speed of rotation refers to the speed of rotation of the primary pulley assembly 43 relative to the secondary speed which is the speed of rotation of the secondary pulley assembly 44.

Figure 6A:
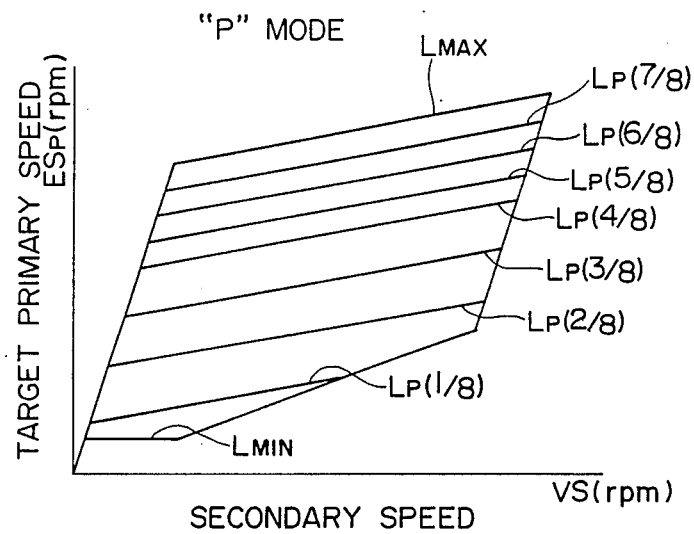
FIG. 6A and 6B are diagrams illustrating maps of speed ratio change schedules for a drive gear range for a power drive mode and an economy drive mode, respectively.
Figure 6B:
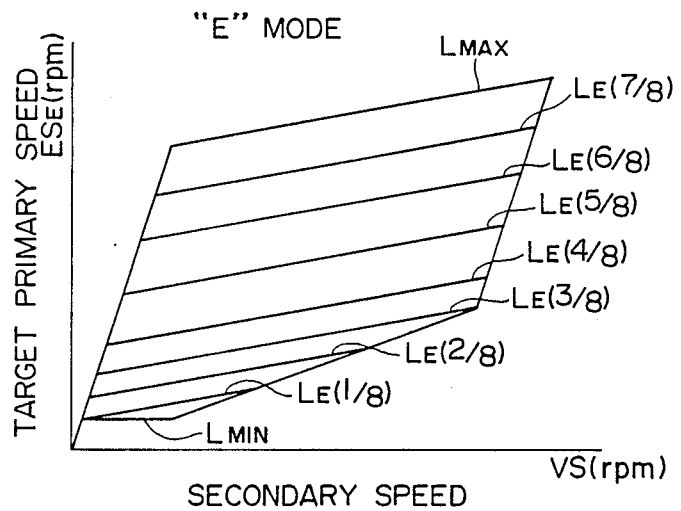

Referring now to FIG. 6A and 6B, illustrating various speed ratio change schedules in the form of a control map for a drive (D) range in the power drive and fuel economy drive modes, respectively, a speed ratio change schedule is previously established for each of nine possible openings of the engine throttle valve between the maximum or full throttle L(8/8) and the minimum or idling throttle L(0/8). As is understood in FIGS. 6A and 6B, the speed control maps for the full throttle and idle are identical between the power drive and fuel economy drive priority modes. In FIG. 6A illustrating speed ratio control map for the fuel economy drive mode, the control line $L_P$ (4/8) at the half throttle opening is established on the higher side of the middle target primary speed between the control lines $L_{MAX}$ and $L_{MIN}$ at the full throttle and idle. Between the control lines $L_{MIN}$ and $L_P$ (4/8) at the idle and half throttle, control lines $L_P(1/8)$-$L_P(3/8)$ are determined using the following expression (I) and change at equal, relatively large steps of rotational speed:

$$L_P(\theta) = [L_P(4/8) - L_{MIN}] \times 2\theta + L_{MIN} \quad \text{(I)}$$

where the throttle position or opening ($\theta$) may be 1/8, 2/8 or 3/8 of the full throttle position or opening.

In the same manner, between the control lines $L_{MAX}$ and $L_P(4/8)$ at the full and half throttles, control lines $L_P(\frac{5}{8})$-$L_P(\frac{7}{8})$ are determined using the following expression (II) and change at equal, relatively small steps of rotational speed:

$$L_P(\theta) = [L_{MAX} - L_P(4/8)] \times 2(\theta - \tfrac{1}{2}) + L_P(4/8) \quad \text{(II)}$$

where the throttle position or opening ($\theta$) may be 5/8, 6/8 or 7/8 of the full throttle position or opening.

As shown in FIG. 6B illustrating speed ratio control map for the fuel economy drive priority mode, the control line $L_E$ (4/8) at the half throttle opening is established on the lower side of the middle target primary speed between the control lines $L_{MAX}$ and $L_{MIN}$ at full throttle ($\theta = 1$) and idle ($\theta = 0$). Between the control lines $L_{MIN}$ and $L_E(4/8)$ at the idle and half throttle, control lines $L_E(\frac{1}{8})$-$L_E(\frac{3}{8})$ are determined using the following expression (III) and change at equal, relatively small steps of rotational speed:

$$L_E(\theta) = [L_E(4/8) - L_{MIN}] \times 2\theta + L_{MIN} \, tm \text{ (III)}$$

where the throttle position or opening ($\theta$) may be 1/8, 2/8 or 3/8 of the full throttle position or opening.

Similarly, between the control lines $L_{MAX}$ and $L_E(4/8)$ at the full and half throttles, control lines $L_E(5/8)$-$L_E(7/8)$ are determined using the following expression (IV) and change at equal, relatively small steps of rotational speed:

$$L_E(\theta) = [L_{MAX} - L_E(4/8)] \times 2(\theta - \tfrac{1}{2}) + L_E(4/8) \quad \text{(IV)}$$

where the throttle position or opening ($\theta$) may be 5/8, 6/8 or 7/8 of the full throttle position or opening.

As apparent from the above description, the change of the target primary speed of rotation is large at relatively small throttle openings but large at relatively small throttle openings under the power drive priority mode. By contrast, under the fuel econonmy drive priority mode, the change of the target primary speed of rotation is small at relatively small throttle openings but large at relatively large throttle openings.

Figure 7A:
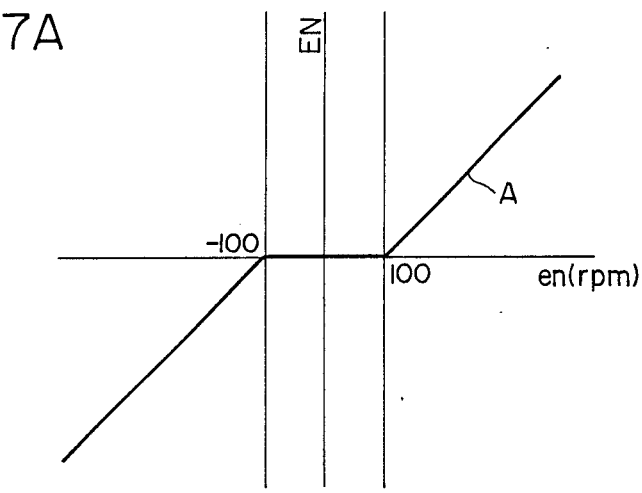
FIG. 7A and 7B are diagrams illustrating the relationship between a speed difference and a deflection parameter for the power drive mode and the economy drive mode, respectively.
Figure 7B:
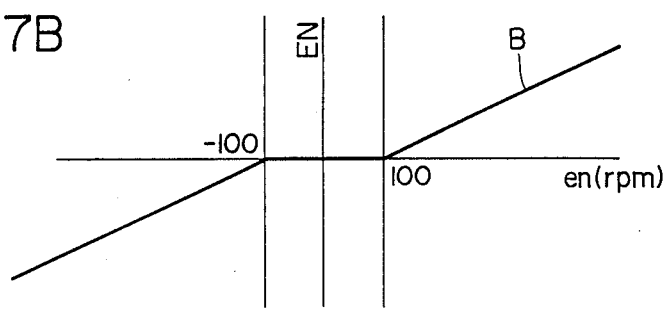

Referring back to the speed ratio control subroutine in FIG. 5, the control unit 91 reads the first speed sensor 93 to detect the actual primary speed of rotation $ES_A$, namely the actual engine speed at step S8, and a speed difference, or deflection, en between the target and actual primary speeds of rotation $ES_P$ or $ES_E$, and $ES_A$ is calculated at step S9. Then, a second decision is made to determine whether the power drive mode "P" or the fuel economy drive mode "E", at step S10. According to the deflection of speed en, the control unit 91 calculates a speed deflection parameter EN on a graph A shown in FIG. 7A when the power drive mode "P" is selected or on a graph B shown in FIG. 7B when the fuel economy mode is selected.

Speed deflection parameter EN relative to the speed deflection en for the power drive mode varies substantially at a ratio of 1:1. However, for the prevention of hunting in feed back control, a hysteresis range wherein the parameter EN is 0 (zero) is provided between the speed deflections of −100 rpm and +100 rpm. As is apparent in FIG. 7B, when the speed deflection parameter EN changes at a rate lower than that of change of the speed deflection en if the speed deflection en is larger than 0 (zero), the transmission is shifted up. When parameter EN changes at a rate higher than that of change of the speed deflection en if the speed deflection en is smaller than 0 (zero), the transmission is shifted down.

Control unit 91 is, in this embodiment, adapted to perform a feed-back control in combination with proportional control, differential control and integral control based on the deflection parameter EN. To this end, at step S13 or S14, some invariants or coefficients, such as a proportional coefficient KP, an integral coefficient KI and a differential coefficient KD are given according to the drive modes.

Based on the thus obtained control values, namely the deflection parameter EN and the coefficients KP, KI and KD, the control unit 91 calculates a feed-back control value F at step S15 using the following expression:

$$F = F1 + KP(EN - EN1) + KI \times EN + KD(EN - 2EN1 + EN2)$$

where
F1 is a feed-back value at the last program execution,
EN is a current deflection parameter,
EN1 is a deflection parameter as of the last program execution, and
EN2 is a deflection parameter as of the program execution two times prior to the current program execution.

Figure 8:
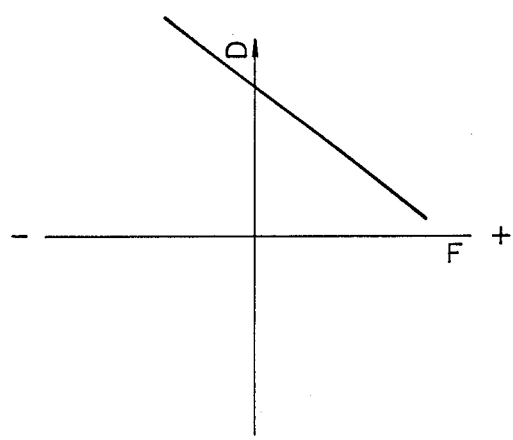
FIG. 8 is a diagram illustrating the relationship between a feed-back control value and a duty rate.

Lastly, the control unit 91 calculates a duty rate for the second duty solenoid valve 62 on a map, shown in FIG. 8, representative of the relationship between feedback control vale F and duty rate D based on the feedback control value F thus obtained.

Control unit 91 controls the second duty solenoid valve 62 to operate at the duty rate so as to vary the oil pressure applied to the primary cylinder 46 of the primary pulley assembly 43 through the first and second speed ratio control valves 57 and 58, thereby to vary the speed ratio of the transmission. In more detail, if the actual primary speed $ES_A$ is lower than the target primary speed $ES_P$ or $ES_E$ and the speed deflection is negative, the duty rate D is corrected to increase the pilot pressure applied to the first and second speed ratio control valves 57 and 58, releasing the pressure from the primary cylinder 46 of the primary pulley assembly 43 to decrease the effective diameter of the primary pulley assembly 43. In such a way, the primary pulley assembly 43 increases its speed of rotation to the target primary speed $ES_P$ or $ES_E$.

On the other hand, if the primary pulley assembly 43 rotates at an actual primary speed $ES_A$ higher than the target primary speed $ES_P$ or $ES_E$ and the speed deflection is positive, the duty rate D is reversely corrected to decrease the pilot pressure, applying pressure in the primary cylinder 46 of the primary pulley assembly 43 to increase the effective diameter of the primary pulley assembly 43. In such a way, the primary pulley assembly 43 decreases its speed of rotation to the target primary speed $ES_P$ or $ES_E$.

Figure 9:
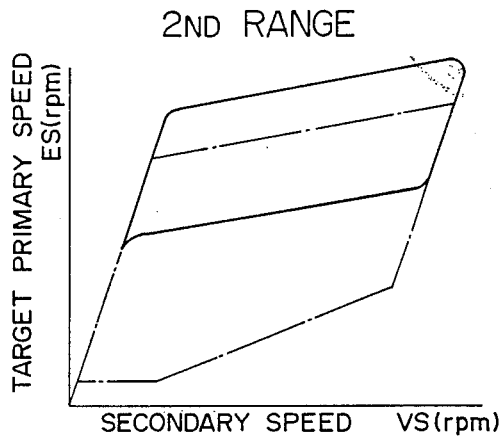
FIG. 9 is a diagram illustrating a map of speed ratio change schedules for a second gear range.
Figure 10:
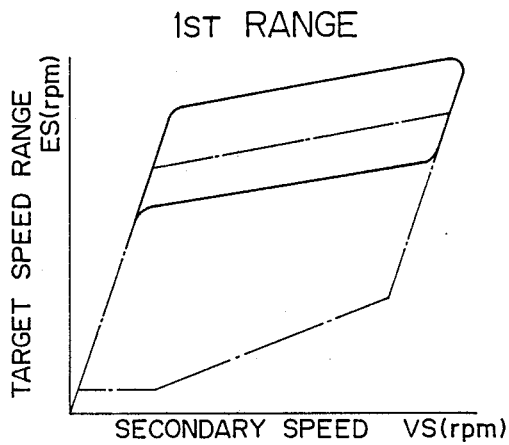
FIG. 10 is a diagram illustrating a map of speed ratio change schedules for a first gear range.

Referring to FIGS. 9 and 10, shown therein are speed ratio change schedule or control maps for a second gear (2) range and a first gear (1) range, respectively. In these maps, a border of the map for the drive (D) range is depicted by a phantom line.

Figure 11:
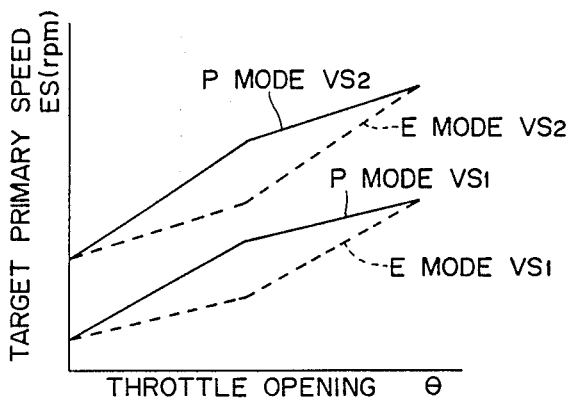
FIG. 11 is a diagram illustrating a map of speed ratio change schedules in which a target engine speed is expressed as a function of throttle opening.

Referring now to FIG. 11, there is shown a variant of a speed ratio change schedule map in which a target primary speed ES is expressed by graphing a function of throttle openings TO. As shown, each speed change schedule for a secondary speed $VS_1$, $VS_2$, ..., $VS_n$, is given as a substantially linear function having a variable point at a half throttle L (4/8) so as to suppress the increase of target primary speed in a range of relatively high engine loads. The invariant of the linear function increasingly changes according to the increase of the secondary speed $VS_1$, $VS_2$, ..., $VS_n$. By determining the target primary speed ES on the speed ratio change schedule map shown in FIG. 11, the increase of driving resistance as vehicle speed increases can be desireably controlled.

The present invention has been fully described in detail with reference to a preferred embodiment and to an alternative embodiment, but it will be understood that other variations and modifications can be affected within the scope of the invention.

What is claimed is:

1. A steplessly variable transmission for automotive vehicles comprising:

transmission means steplessly variable in speed ratio which has a pair of pulleys variable in effective diameter and coupled to each other with endless belt means, one of said pair of pulleys being in association with an vehicle engine and the other being in association with a drive line;

speed ratio control means for varying the speed ratio of the transmission means according to speed ratio change schedules of a target engine speed relative to a vehicle speed depending upon load conditions of the vehicle engine, and drive mode changing means for changing said steplessly variable transmission in operation between a power drive mode suitable for powerful driving and an economy drive mode suitable for fuel economy driving and changing said speed ratio change schedules to different patterns suitable for said power drive mode and a pattern suitable for said economy drive mode according to the change of drive mode; and said speed ratio change schedules at a maximum and a minimum engine load being identical between said power drive and economy drive modes, and, between said maximum and minimum engine loads, changing the ratio of change of said target engine speed relative to change of engine load at a relatively high ratio of change within a range of relatively low engine loads for said power drive mode and within a range of relatively high engine loads for said economy drive mode and at a relatively low ratio within a range of relatively high engine loads for said power drive mode and within a range of relatively low engine loads for said economy drive mode.

2. A steplessly variable transmission as defined in claim 1, wherein said target engine speed according to said speed ratio change schedules between said maximum and minimum engine loads for said power drive mode is established using one of a first function of engine load within a range of engine loads lower than a predetermined engine load and a second function of engine load within a range of engine loads higher than said predetermined engine loads and said target engine speed according to said speed ratio change schedules between said maximum and minimum engine loads for said economy drive mode is established using one of a third function of engine load within a range of engine loads lower than said predetermined engine load and a fourth function of engine load within a range of engine loads higher than said predetermined engine load, said first function having a larger invariable than that of said third function and said second function having a smaller invariable than that of said fourth function.

3. A steplessly variable transmission as defined in claim 2, wherein said engine load is expressed as a function of throttle valve opening of a throttle valve of said vehicle engine.

4. A steplessly variable transmission as defined in claim 3, wherein said predetermined engine load is the load at substantially half throttle.

5. A steplessly variable transmission as defined in claim 3, wherein said target engine speed at substantially half throttle is higher for said power drive mode than for said economy drive mode.

6. A steplessly variable transmission as defined in claim 2, wherein each of said first to fourth functions is a positive linear function.

7. A steplessly variable transmission as defined in claim 6, wherein said first function has a proportional invariable larger than that of said third function and said second function has a proportional invariable smaller than that of said fourth function.

8. A steplessly variable transmission as defined in claim 7, wherein each said proportional invariable increasingly changes proportionally to the increase of speed of said pulley in association with drive line.

9. A steplessly variable transmission as defined in claim 2, wherein said speed ratio is controlled by feed-back control depending upon a speed deflection between said target engine speed and an actual engine speed.

10. A steplessly variable transmission as defined in claim 9, wherein at least one of a feed-back control gain and a control value in said feed-back control are changeable between said power drive and economy drive modes.

11. A steplessly variable transmission as defined in claim 10, wherein at least one of said feed-back control gain and said control value is larger for said power drive mode than for said economy drive mode.

12. A method of steplessly varying the ratio of speed of an automotive vehicle transmission comprising the steps of:

providing a pair of pulleys variable in effective diameter and coupled to each other with endless belt means, one of said pair of pulleys being in association with a vehicle engine and the other being in association with a drive line, said transmission being changeable in operation between a power drive mode suitable for powerful driving and an economy drive mode suitable for fuel economy driving, determining an operating drive mode in which said automotive vehicle transmission is operated;

calculating a target engine speed on predetermined speed ratio change schedules of a target engine speed relative to a vehicle speed for one of said power drive mode and said economy drive mode according to said operating drive mode, said speed ratio change schedules being different depending upon engine loads and the operating drive mode in which said automotive vehicle transmission is operated;

detecting an actual engine speed;

calculating a speed difference between said target engine speed and said actual engine speed, calculating a duty cycle at which duty solenoid valve means is controlled to change a pilot pressure for control valve means so as to change said one of said pair of pulleys in effective diameter according to the calculated speed difference.

13. A method as defined in claim 12, wherein said speed ratio change schedules at a maximum and a minimum engine load are identical in said power drive and economy drive modes but vary at a relatively high ratio within a range of relatively low engine loads for said power drive mode and within a range of relatively high engine loads for said economy drive mode, the ratio of change of said target engine speed relative to change of engine load being at a relatively low ratio within a range of relatively high engine loads for said power drive mode and within a range of relatively low engine loads for said economy drive mode, between said maximum and minimum engine loads.

* * * * *